US010469654B2

(12) United States Patent
Zhang

(10) Patent No.: US 10,469,654 B2
(45) Date of Patent: Nov. 5, 2019

(54) ELECTRONIC DEVICE, PROMPTING METHOD AND RELATED PRODUCT

(71) Applicant: GUANGDONG OPPO MOBILE TELECOMMUNICATIONS CORP., LTD., Dongguan, Guangdong (CN)

(72) Inventor: Haiping Zhang, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

(21) Appl. No.: 16/173,920

(22) Filed: Oct. 29, 2018

(65) Prior Publication Data
US 2019/0230214 A1 Jul. 25, 2019

(30) Foreign Application Priority Data

Jan. 23, 2018 (CN) .......................... 2018 1 0065731

(51) Int. Cl.
*H04M 1/725* (2006.01)
*G06F 9/445* (2018.01)
*G06F 8/61* (2018.01)

(52) U.S. Cl.
CPC ........ *H04M 1/72597* (2013.01); *G06F 9/445* (2013.01); *H04M 1/72522* (2013.01);
(Continued)

(58) Field of Classification Search
CPC ............... H04M 1/04; H04M 2250/12; H04M 1/72522; H04M 1/0279; H04M 1/15; H04M 1/6058; H04M 1/72519; H04M 2250/22
See application file for complete search history.

(56) References Cited

U.S. PATENT DOCUMENTS 6,233,455 B1 5/2001 Ramakrishna
9,008,629 B1 4/2015 Masterman
(Continued)

FOREIGN PATENT DOCUMENTS

CN 102413442 A 4/2012
CN 104931055 A 9/2015
(Continued)

OTHER PUBLICATIONS

International Search Report in the international application No. PCT/CN2018/119016, dated Feb. 27, 2019.
(Continued)

*Primary Examiner* — Kwasi Karikari
(74) *Attorney, Agent, or Firm* — Ladas & Parry, LLP

(57) ABSTRACT

Disclosed are an electronic device, a prompting method and a related product. The electronic device includes a processor as well as a display and a memory connected with the processor. The display is configured to display an application program running in foreground. The memory is configured to store a preset application program, a falling probability corresponding to the preset application program being higher than a preset falling probability and the falling probability corresponding to the preset application program being a probability that the electronic device falls when the preset application program runs in foreground. The processor is configured to detect whether the application program running in foreground is the preset application program or not and control the display to output a prompting message when it is detected that the application program running in foreground is the preset application program.

20 Claims, 9 Drawing Sheets

(52) U.S. Cl.
CPC ......... *H04M 1/72569* (2013.01); *G06F 8/61* (2013.01); *H04M 2250/12* (2013.01)

(56) References Cited

U.S. PATENT DOCUMENTS

| | | | |
|---|---|---|---|
| 2006/0070439 A1* | 4/2006 | Kwon | G01P 15/00 |
| | | | 73/488 |
| 2012/0157073 A1* | 6/2012 | Kim | G06F 1/1626 |
| | | | 455/418 |
| 2016/0242001 A1 | 8/2016 | Dong et al. | |
| 2017/0201619 A1 | 7/2017 | Cohen et al. | |
| 2017/0243457 A1 | 8/2017 | Milbrand | |
| 2019/0037067 A1 | 1/2019 | Cohen et al. | |

FOREIGN PATENT DOCUMENTS

| | | |
|---|---|---|
| CN | 104980565 A | 10/2015 |
| CN | 106325514 A | 1/2017 |
| CN | 106331361 A | 1/2017 |
| CN | 106355115 A | 1/2017 |
| CN | 106412246 A | 2/2017 |
| CN | 106453767 A | 2/2017 |
| CN | 108197006 A | 6/2018 |

OTHER PUBLICATIONS

Written Opinion of the International Search Authority in the international application No. PCT/CN2018/119016, dated Feb. 27, 2019.
European Search Report in the European application No. 18206422.0, dated Jun. 4, 2019.

* cited by examiner

Electronic device　　　　　　　　　　　　　　　　Server

ELECTRONIC DEVICE, PROMPTING METHOD AND RELATED PRODUCT

CROSS-REFERENCE TO RELATED APPLICATIONS

The present application is based upon and claims priority to Chinese Patent Application No. 201810065731.2, filed on Jan. 23, 2018, the contents of which are hereby incorporated by reference in its entirety.

BACKGROUND

Along with widespread popularization and rapid development of electronic devices (for example, smart phones), more and more applications are installed in an electronic device of a user, for example, a video application, a payment application, a game application, a music application, or the like.

A component of an electronic device may usually be damaged because of falling and service life thereof is shortened. Therefore, how to avoid an electronic device to fall, how to improve drop resistance of a component of the electronic device and how to prolong service life of the electronic device become problems urgent to be solved.

SUMMARY

The disclosure relates to mobile terminals, and more particularly to an electronic device, a prompting method and a related product.

According to a first aspect, the embodiments of the disclosure provide an electronic device, which may include a processor, a display and memory connected with the processor. The display is configured to display an application program running in foreground. The memory is configured to store a preset application program, a falling probability corresponding to the preset application program being higher than a preset falling probability and the falling probability corresponding to the preset application program being a probability that the electronic device falls when the preset application program runs in foreground. The processor is configured to detect whether the application program running in foreground is the preset application program or not and when it is detected that the application program running in foreground is the preset application program, control the display to output a prompting message.

According to a second aspect, the embodiments of the disclosure provide a falling prompting method. An application program running in foreground is determined. It is detected whether the application program running in foreground is a preset application program or not, a falling probability corresponding to the preset application program being higher than a preset falling probability and the falling probability corresponding to the preset application program being a probability that an electronic device falls when the preset application program runs in foreground. When it is detected that the application program running in foreground is the preset application program, a prompting message is output.

According to a third aspect, the embodiments of the disclosure provide a prompting device, including a determination unit, a detection unit and an output unit. The determination unit is configured to determine an application program running in foreground. The detection unit is configured to detect whether the application program, determined by the determination unit, running in foreground is a preset application program or not, a falling probability corresponding to the preset application program being higher than a preset falling probability and the falling probability corresponding to the preset application program being a probability that an electronic device falls when the preset application program runs in foreground. The output unit is configured to, when the detection unit detects that the application program running in foreground is the preset application program, output a prompting message.

According to a fourth aspect, the embodiments of the disclosure provide an electronic device, including a processor, a memory, a communication interface and one or more programs. The one or more programs may be stored in the memory and may be configured to be executed by the processor. The programs may include instructions configured to execute the steps in any method according to the second aspect of the embodiments of the disclosure.

According to a fifth aspect, the embodiments of the disclosure provide a computer-readable storage medium. The computer-readable storage medium may store a computer program configured for electronic data exchange. The computer program may enable a computer to execute part or all of the steps described in any method according to the second aspect of the embodiments of the disclosure.

According to a sixth aspect, the embodiments of the disclosure provide a computer program product. The computer program product includes a non-transitory computer-readable storage medium for storing a computer program. The computer program may be operated to enable a computer to execute part or all of the steps described in any method according to the second aspect of the embodiments of the disclosure. The computer program product may be a software installation package.

BRIEF DESCRIPTION OF DRAWINGS

In order to describe the technical solutions in the embodiments of the disclosure or a conventional art more clearly, the drawings required to be used in descriptions about the embodiments or the conventional art will be simply introduced below. It is apparent that the drawings described below are only some embodiments of the disclosure. Other drawings may further be obtained by those of ordinary skill in the art according to these drawings without creative work.

DETAILED DESCRIPTION

In order to make the solutions of the disclosure understood by those skilled in the art, the technical solutions in the embodiments of the disclosure will be clearly and completely described below in combination with the drawings in the embodiments of the disclosure. It is apparent that the described embodiments are not all embodiments but only part of embodiments of the disclosure. All other embodiments obtained by those of ordinary skill in the art on the basis of the embodiments in the disclosure without creative work shall fall within the scope of protection of the disclosure.

Terms "first", "second" or the like in the specification, claims and drawings of the disclosure are adopted not to describe a specific sequence but to distinguish different objects. In addition, terms "include" and "have" and any transformations thereof are intended to cover nonexclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

"Embodiment" mentioned in the disclosure means that a specific feature, structure or characteristic described in combination with an embodiment may be included in at least one embodiment of the disclosure. Each position where this phrase appears in the specification does not always refer to the same embodiment as well as an independent or alternative embodiment mutually exclusive to another embodiment. It is explicitly and implicitly understood by those skilled in the art that the embodiments described in the disclosure may be combined with other embodiments.

An electronic device involved in the embodiments of the disclosure may include various handheld devices, vehicle-mounted devices, wearable devices, computing devices or other processing devices connected to wireless modems, which have a wireless communication function, as well as User Equipment (UE), Mobile Stations (MSs), terminal devices or the like in various forms. For convenient description, the devices mentioned above are collectively referred to as electronic devices.

The embodiments of the disclosure will be introduced below in detail.

Figure 1:
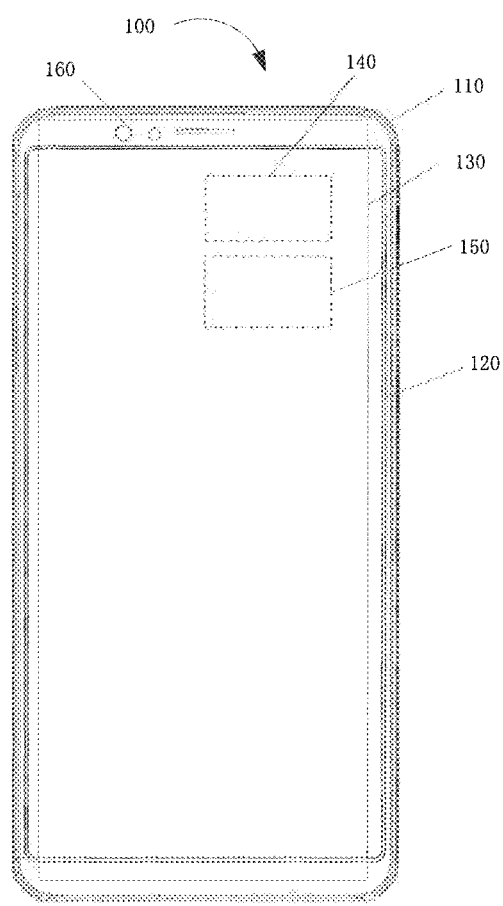
FIG. 1 is a structure diagram of an electronic device according to an embodiment of the disclosure.

Referring to FIG. 1, FIG. 1 is a structure diagram of an electronic device 100 according to an embodiment of the disclosure. The electronic device 100 includes a shell 110, a display 120 and a main board 130. A processor 140, a memory 150, a camera 160 or the like are arranged on the main board 130.

The display 120 is configured to display an application program running in foreground.

The memory 150 is configured to store a preset application program, a falling probability corresponding to the preset application program being higher than a preset falling probability and the falling probability corresponding to the preset application program being a probability that the electronic device 100 falls when the preset application program runs in foreground.

The processor 140 is configured to detect whether the application program running in foreground is the preset application program or not and control the display 120 to output a prompting message, when it is determined that the application program running in foreground is the preset application program. The prompting message is configured to prompt the user to prevent the electronic device from falling.

The display 120 includes a display driving circuit, a display screen and a touch screen. The display driving circuit is configured to control the display screen to display content according to display data and display parameter (for example, luminance, color and saturation) of a picture. The touch screen is configured to detect a touch operation. The display screen is an Organic Light-Emitting Diode (OLED) display screen.

The main board 130 may have any size and any shape which may be accommodated in the electronic device. There are no exclusive limits made herein.

The processor 140 is a control center of a mobile terminal. The processor 140 connects with respective parts of the electronic device via various interfaces and wirings and executes various functions and data processing of the electronic device by running or executing a software program and/or module(s) stored in the memory 150 and calling data stored in the memory 150, thereby monitoring the whole electronic device. In at least one embodiment, the processor 140 may integrate an application processor and a modulation and demodulation processor. The application processor mainly processes an operating system, a user interface, an application program or the like. The modulation and demodulation processor mainly processes wireless communication. It can be understood that the modulation and demodulation processor may also not be integrated into the processor 140.

The memory 150 may be configured to store the software program and one or more modules. The processor 140 runs the software program and the one or more module stored in the memory 150, thereby executing various function applications and data processing of the electronic device. The memory 150 may mainly include a program storage region and a data storage region. The program storage region may store the operating system, an application program required by at least one function or the like. The data storage region may store data generated in use of the electronic device or the like. In addition, the memory 150 may include a high-speed Random Access Memory (RAM) and may further include a nonvolatile memory, for example, at least one disk storage device, flash memory device or other volatile solid-state storage device.

As can be seen, in the embodiments of the disclosure, the electronic device includes the processor as well as the display and the memory connected with the processor. The display is configured to display the application program running in foreground. The memory is configured to store the preset application program, the falling probability corresponding to the preset application program being higher than the preset falling probability and the falling probability corresponding to the preset application program being the probability that the electronic device falls when the preset application program runs in foreground. The processor is configured to detect whether the application program running in foreground is the preset application program or not and control the display to output the prompting message, when it is determined that the application program running in foreground is the preset application program. As can be seen, when it is determined that the application program running in foreground is the preset application program of which the falling probability is higher than the preset falling probability in using, the electronic device outputs the prompting message to prompt a user that the electronic device likely occurs to fall when the present application program is used and prompt the user to regulate a manner of operating the present application program to prevent occurrence of the falling event. It is favorable for reducing the falling probability of the electronic device and prolonging service life of the electronic device.

Figure 2:
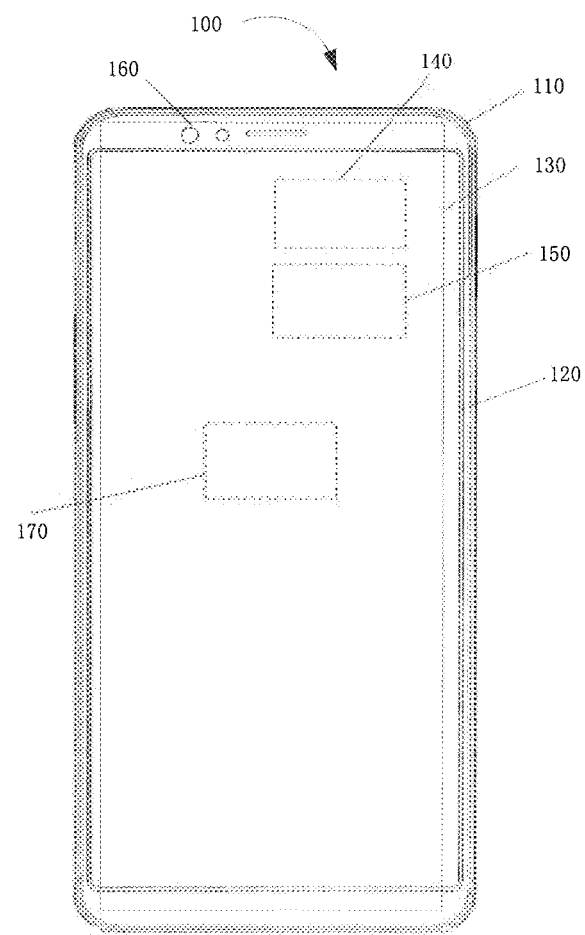
FIG. 2 is a structure diagram of another electronic device according to an embodiment of the disclosure.

In a possible example, as shown in FIG. 2, the electronic device 100 further includes an accelerometer 170. The processor 140, before detecting whether the application program running in foreground is the preset application program or not, is further configured to acquire a reference application program running in foreground when the accelerometer 170 detects that the electronic device 100 falls, determine a falling probability corresponding to the reference application program according to a historical usage record and determine that the reference application program is the preset application program when it is judged that the falling probability corresponding to the reference application program is higher than the preset falling probability pre-stored in the memory 150.

Figure 3:
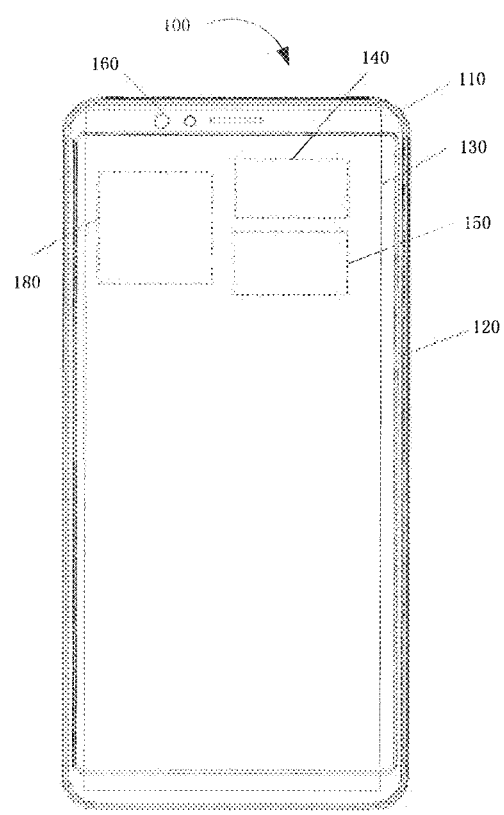
FIG. 3 is a structure diagram of an additional electronic device according to an embodiment of the disclosure.

In a possible example, as shown in FIG. 3, the electronic device 100 further includes a communication module 180. Before the processor 140 detects whether the application program running in foreground is the preset application program or not, a preset application set sent by a server is received through the communication module 180, the preset application set including at least one application program and the at least one application program being an application program determined by the server according to received falling data from a plurality of electronic devices. The processor 140 is configured to select an application program which has been installed in the electronic device 100 in the preset application set as the preset application program.

Figure 4:
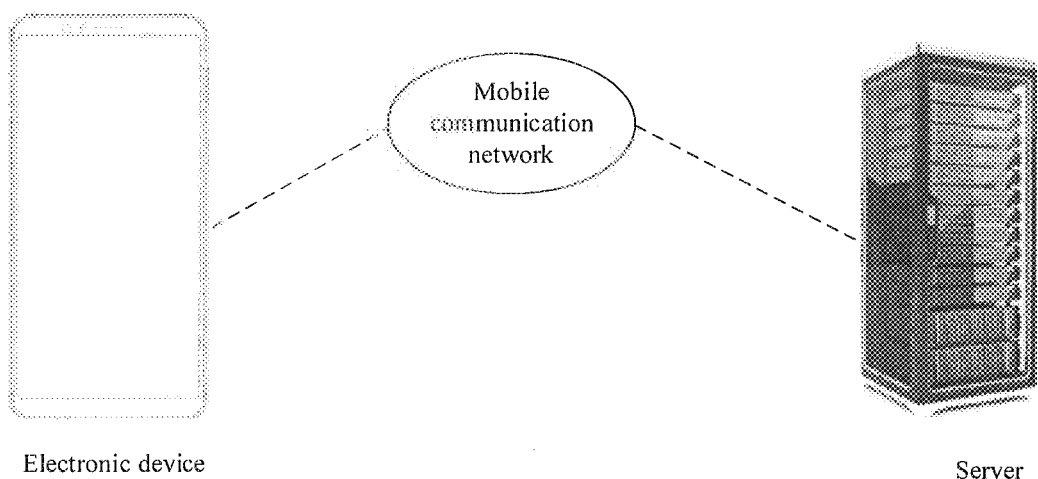
FIG. 4 is a schematic diagram of architecture of mobile communication between an electronic device and a server according to an embodiment of the disclosure.

As shown in FIG. 4, the electronic device is connected in communication with the server through a mobile communication network. The server may be a server owned by a manufacturer of the electronic device and is configured to collect falling data of each of electronic devices, perform data analysis according to a preset data analysis model and determine the preset application set according to an obtained analysis.

In a possible example, in controlling the display 120 to output the prompting message when it is detected that the application program running in foreground is the preset application program, the processor 140 is configured to acquire an environmental parameter when it is detected that the application program running in foreground is the preset application program and control the display 120 to output the prompting message according to the environmental parameter.

In the possible example, in controlling the display 120 to output the prompting message according to the environmental parameter, the processor 140 is configured to control the display 120 to output the prompting message, when it is detected that a height parameter of the electronic device 100 is greater than a preset height threshold value, and/or, when it is detected that a temperature parameter in the environmental parameter is smaller than a preset temperature threshold value.

In a possible example, in controlling the display 120 to output the prompting message when it is detected that the application program running in foreground is the preset application program, the processor 140 is configured to, when it is detected that the application program running in foreground is the preset application program, acquire an operating frequency of the touch screen in the display 120 within a preset time and control the display 120 to output the prompting message when it is detected that the operating frequency is higher than a preset frequency threshold value.

In a possible example, in controlling the display 120 to output the prompting message, the processor 140 is configured to acquire a falling probability of the application program running in foreground, determine an output strategy for the prompting message according to the falling probability and control the display 120 to output the prompting message according to the output strategy.

Figure 5:
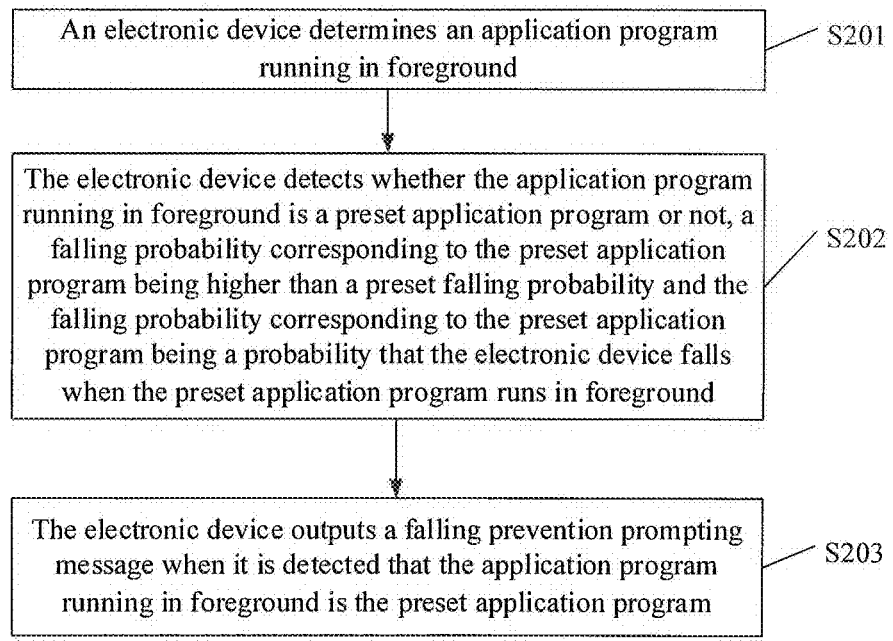
FIG. 5 is a flowchart of a prompting method according to an embodiment of the disclosure.

Referring to FIG. 5, FIG. 5 is a flowchart of a prompting method according to an embodiment of the disclosure. The prompting method is applied to the electronic device shown in any one of FIGS. 1 to 4. As shown in FIG. 5, the method includes the following operations.

In S201, the electronic device determines an application program running in foreground.

The application program running in foreground is an application program presently displayed on a display screen of the electronic device, i.e., an application program presently operated and controlled by a user.

Before the electronic device determines the presently running application program, the electronic device detects a startup operation for any application program which has been installed in the electronic device. The startup operation may be, for example, a clicking operation over an application icon corresponding to any one application program which has been installed, a voice operation or the like.

The electronic device determines the presently running application program may be implemented as follows. The electronic device determines the application program running in foreground at a preset interval. The preset interval may be preset by a developer before the electronic device is delivered or may be an average time interval, determined according to historical usage of the electronic device by the user, for starting the application program, which will not be limited herein.

In S202, the electronic device detects whether the application program running in foreground is a preset application program or not, a falling probability corresponding to the preset application program being higher than a preset falling probability and the falling probability corresponding to the preset application program being a probability that an electronic device falls when the preset application program runs in foreground.

The preset application program may be determined by the electronic device and may also be sent to the electronic device by the server of the manufacturer of the electronic device. There are no exclusive limits made herein.

The falling probability may be a ratio of the number of times of falling during running of the preset application program in foreground to the total number of times for which the electronic device falls and may also be a ratio of the number of times of falling during running of the preset application program in foreground to the number of times for which the preset application program runs in foreground. The preset falling probability may be determined by the developer according to a test and analysis result obtained before the electronic device is delivered and then is preset in the electronic device or the server.

In S203, the electronic device outputs a prompting message, when it is detected that the application program running in foreground is the preset application program.

There is a plurality of preset application programs. When the application program running in foreground is any one of preset application programs, the prompting message is output.

The prompting message may be outputted in various manners, such as, voice prompting, breathing light flickering prompting and text message prompting. There are no exclusive limits made herein.

Different application programs may correspond to different output manners for the prompting message. For example, when the preset application program is a game application program, a breathing light may flicker to prompt the user so as to avoid interference to a game operation of the user. When the preset application program is a call application program, the user may be prompted by vibration.

When the prompting message is a text prompting message, different application programs may use different positions for outputting a text prompting message to enable the position for outputting the text prompting message not to influence the operation of the user or view a content displayed on the display screen by the user.

In a possible example, the operation that the prompting message is output includes that a falling probability of the application program running in foreground is acquired; an output strategy for the prompting message is determined according to the falling probability; and the prompting message is output according to the output strategy.

Various manners may be adopted for determining the output strategy for the prompting message according to the falling probability. For example, an output frequency of the prompting message may be determined according to the falling probability and the output frequency of the prompting message may be directly proportional to the falling probability. Alternatively, the output manner for the prompting message may be determined according to the falling probability. There are no exclusive limits made herein.

In the embodiment of the disclosure, the electronic device determines the application program running in foreground at first, then detects whether the application program running foreground is the preset application program or not, the falling probability corresponding to the preset application program being higher than the preset falling probability and the falling probability corresponding to the preset application program being the probability that the electronic device falls when the preset application program runs in foreground, and finally, when it is detected that the application program running in foreground is the preset application program, outputs the prompting message. Thus, when it is detected that the application program running in foreground is the preset application program of which the falling probability is higher than the preset falling probability in using, the electronic device outputs the prompting message to prompt the user that a falling event is likely to occur when the present application program is used and prompt the user to regulate a manner of operating the present application program to prevent occurrence of the falling event. It is favorable for reducing the falling probability of the electronic device and prolonging service life of the electronic device.

In a possible example, before when it is detected whether the application program running in foreground is the preset application program or not, when it is detected that the electronic device falls, a reference application program running in foreground is acquired. A falling probability corresponding to the reference application program is determined according to a historical usage record. When it is determined that the falling probability corresponding to the reference application program is higher than the preset falling probability, it is determined that the reference application program is the preset application program.

When an accelerometer detects that an acceleration direction or acceleration value of the electronic device suddenly changes, it may be determined that the electronic device falls.

Figure 6:
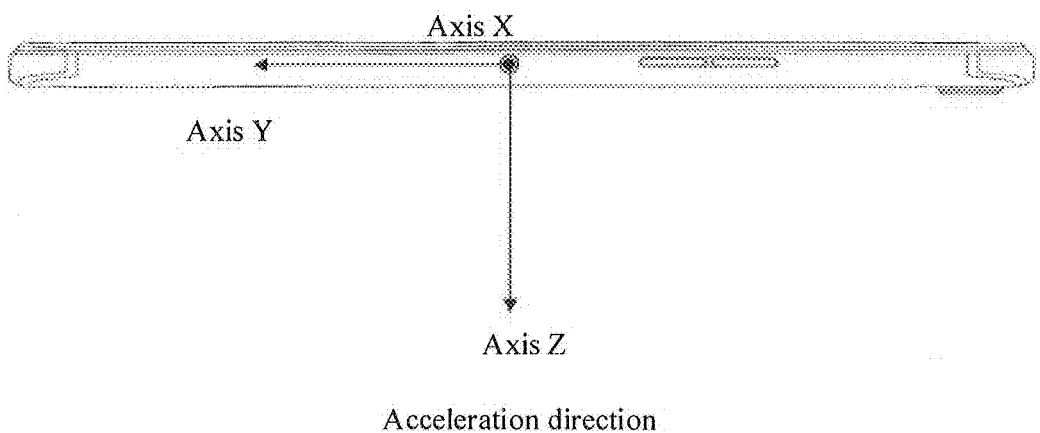
FIG. 6 is a schematic diagram of an acceleration direction when an electronic device is horizontally placed according to an embodiment of the disclosure.
Figure 7:
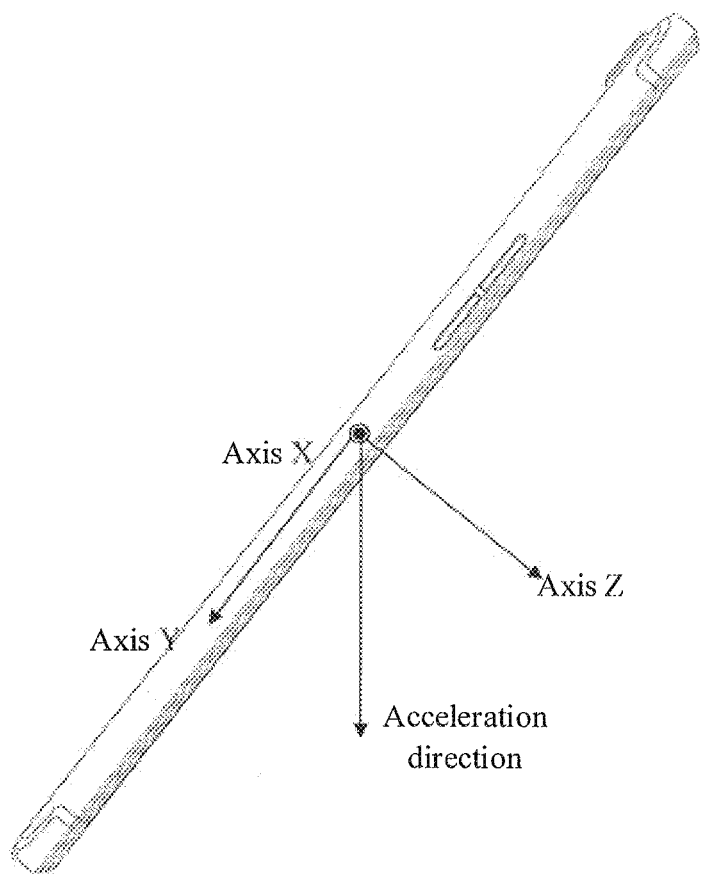
FIG. 7 is a schematic diagram of an acceleration direction when an electronic device falls according to an embodiment of the disclosure.

For example, when the electronic device is horizontally placed, as shown in FIG. 6, an axis X, an axis Y and an axis Z of the accelerometer are shown in the figure. An acceleration of the electronic device is gravity acceleration in the direction of the axis Z. When a falling event occurs to the electronic device, as shown in FIG. 7, the acceleration direction of the electronic device may be an acceleration direction shown in the figure, which is different from the acceleration direction in horizontal placement. At this time, the acceleration suddenly changes and thus the electronic device falls.

The reference application program running in foreground is an application program displayed on the display screen of the electronic device when the electronic device falls.

The historical usage record is a record made when the electronic device fell previously. The historical usage record includes a parameter such as the application program displayed in foreground during falling, a falling height or the like.

Thus, as can be seen in the example that, when the electronic device falls, the falling probability of the foreground reference application program is determined according to the historical usage record and the reference application program is determined to be the preset application program according to the falling probability. Determination of the preset application program is consistent with a using habit of the user, which is favorable for improving determination accuracy and intelligence of the preset application program.

In a possible example, before it is detected whether the application program running in foreground is the preset application program or not, a set of preset applications sent by a server is received, the set of preset applications including at least one application program and the at least one application program being an application program determined by the server according to received falling data from a plurality of electronic devices. An application program which has been installed in the electronic device in the set of preset applications is selected as the preset application program.

The server performs data statistics according to the falling data of the plurality of electronic devices. The server puts the numbers of times for which the plurality of electronic devices running the same foreground application program fall together to perform statistics, and thus further determines a falling probability of the foreground application program. The server determines whether to add the application program into the set of preset applications or not according to the falling probability.

Thus it can be seen in the example that, the electronic device receives the preset application set sent by the serve and selects an application program suitable for the electronic device as the preset application program according to the set of preset applications. That is, the preset application program is determined by the server according to big data, which is favorable for improving determination comprehensiveness and accuracy of the preset application program.

Moreover, determination through the server prevents a system resource of the electronic device from being occupied and is favorable for improving convenience and speed for determination of the preset application program.

In a possible example, the operation that the prompting message is output when it is detected that the application program running in foreground is the preset application program includes that, when it is detected that the application program running in foreground is the preset application program, an environmental parameter is acquired; and the prompting message is output according to the environmental parameter.

The environmental parameter includes a height parameter, a temperature parameter, a ground material parameter or the like. The height parameter may be detected by an infrared sensor. The temperature parameter may be determined by a temperature sensor. The ground material parameter may be detected by a camera.

The operation that the prompting message is output according to the environmental parameter refers to that the prompting message is output when it is detected that the environmental parameter is consistent with a preset condition. There may be various preset conditions, for example, a height condition, a temperature condition and a ground material condition. There are no exclusive limits made herein.

Thus it can be seen in the example that, the electronic device outputs the prompting message according to the environmental parameter rather than outputting the prompting message immediately responsive to detecting that the application program running in foreground is the preset application program, which avoids power consumption of the electronic device and influence on the operation of the user when the unnecessary prompting message is output. It is favorable for improving prompt accuracy.

In a possible example, the operation that the prompting message is output according to the environmental parameter includes that, when it is detected that the height parameter of the electronic device is greater than a preset height threshold value, and/or, when it is detected that the temperature parameter in the environmental parameter is smaller than a preset temperature threshold value, the prompting message is output.

The preset height threshold value and the temperature threshold value may be empirical values and may be preset in the program of the electronic device by the developer before delivery. The preset height threshold value is a minimum height parameter which may cause a component to be damaged after occurrence of falling. The preset temperature threshold value is a maximum temperature parameter in a plurality of temperature parameters which may cause the electronic device to be dropped by the user due to low temperature parameters.

Thus it can be seen in the example that, when it is detected that the height parameter is greater than the preset height threshold value and/or the temperature parameter is smaller than the preset temperature threshold value, the electronic device outputs the prompting message, which is favorable for reducing the number of times of unnecessary message prompting and reducing power consumption of the electronic device.

In a possible example, the operation that the prompting message is output when it is detected that the application program running in foreground is the preset application program includes that, when it is detected that the application program running in foreground is the preset application program, an operating frequency for the touch screen within a preset time is acquired; and when it is detected that the operating frequency is higher than a preset frequency threshold value, the prompting message is output.

The operating frequency may be the number of operations per minute. The operating frequency within the preset time may be an average operating frequency in the preset time.

For example, when the application program running in foreground and the preset application program are both game application programs, since the numbers of operations over the touch screen within the preset time for the game application programs are excessively large, the electronic device is likely to fall due to misoperations in an operating process.

Thus it can be seen in the example that, when the operating frequency for the touch screen in the preset time is higher than the preset frequency threshold value, the electronic device outputs the prompting message, which is favorable for improving falling prompting timeliness and accuracy.

Figure 8:
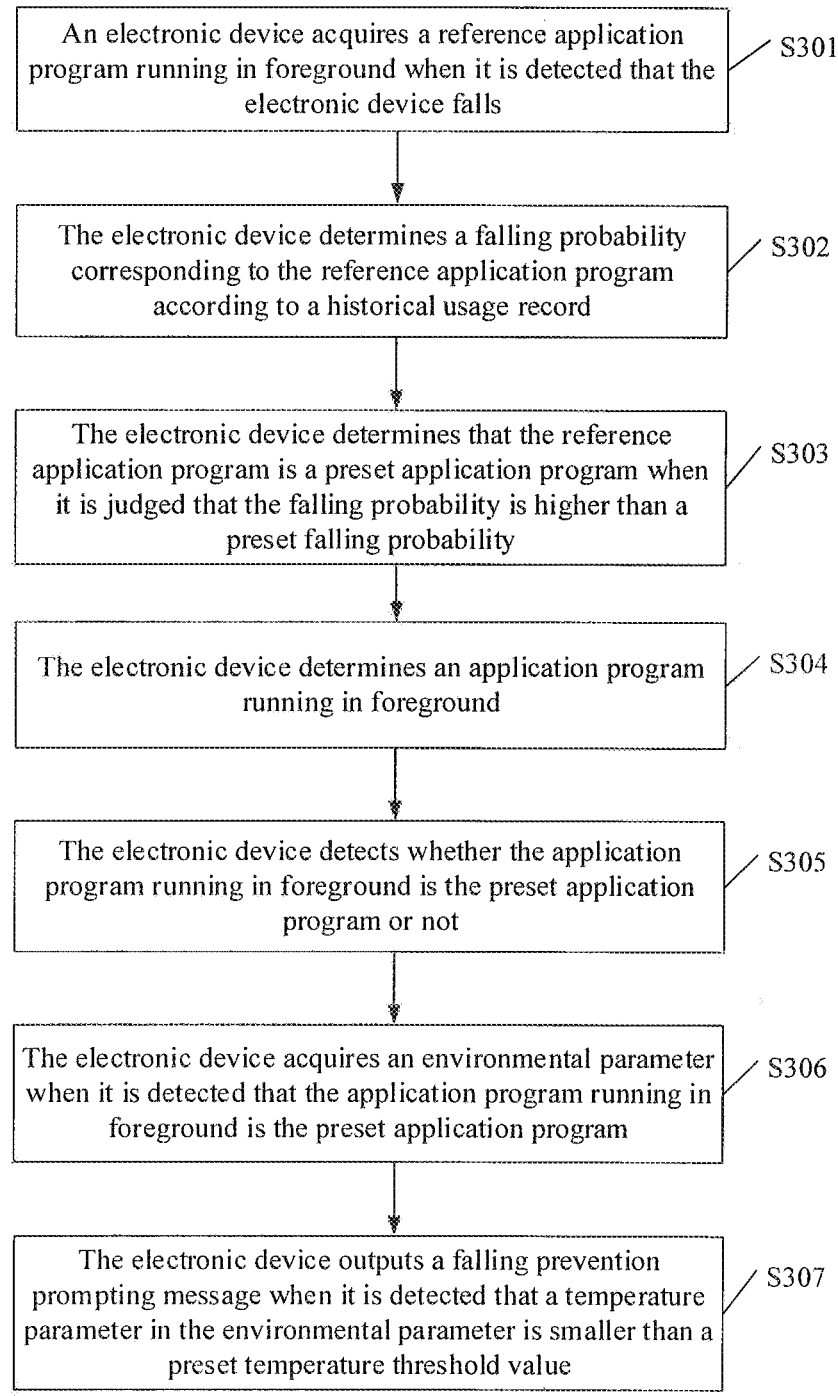
FIG. 8 is a flowchart of another prompting method according to an embodiment of the disclosure.

In line with the embodiment shown in FIG. 5, referring to FIG. 8, FIG. 8 is a flowchart of a prompting method according to an embodiment of the disclosure. The prompting method is applied to the electronic device of any embodiment of FIG. 1 to 4 and, as shown in the figure, includes the following operations.

In S301, the electronic device, when it is detected that the electronic device falls, acquires a reference application program running in foreground.

In S302, the electronic device determines a falling probability corresponding to the reference application program according to a historical usage record.

In S303, the electronic device determines that the reference application program is a preset application program when it is determined that the falling probability is higher than a preset falling probability.

In S304, the electronic device determines an application program running in foreground.

In S305, the electronic device detects whether the application program running in foreground is the preset application program or not.

In S306, the electronic device, when it is detected that the application program running in foreground is the preset application program, acquires an environmental parameter.

In S307, the electronic device, when it is determined that a temperature parameter in the environmental parameter is smaller than a preset temperature threshold value, outputs a prompting message.

It can be seen that, in the embodiment of the disclosure, the electronic device determines the application program running in foreground at first, then detects whether the application program running foreground is the preset application program or not, the falling probability corresponding to the preset application program being higher than the preset falling probability and the falling probability corresponding to the preset application program being the probability that the electronic device falls when the preset application program runs in foreground, and finally, when it is detected that the application program running in foreground is the preset application program, outputs the prompting message. Thus it can be seen that the electronic device, when it is detected that the application program running in foreground is the preset application program of which the corresponding falling probability is higher than the preset falling probability in a using process, outputs the prompting message to prompt the user that a falling event is likely to occur when the present application program is used and prompt the user to regulate a manner of operating the present application program to prevent occurrence of the falling event, which is favorable for reducing the falling probability of the electronic device and prolonging service life of the electronic device.

In addition, when the electronic device falls, the falling probability of the foreground reference application program is determined according to the historical usage record and the reference application program is determined to be the preset application program according to the falling probability. Determination of the preset application program is consistent with a using habit of the user, which is favorable for improving determination accuracy and intelligence of the preset application program.

Moreover, the electronic device outputs the prompting message when the temperature parameter is lower than the preset temperature threshold value rather than outputting the prompting message immediately responsive to detecting that the application program running in foreground is the preset application program, which avoids power consumption of the electronic device and influence on the operation of the user when the unnecessary prompting message is output and is favorable for improving falling prompting accuracy.

Figure 9:
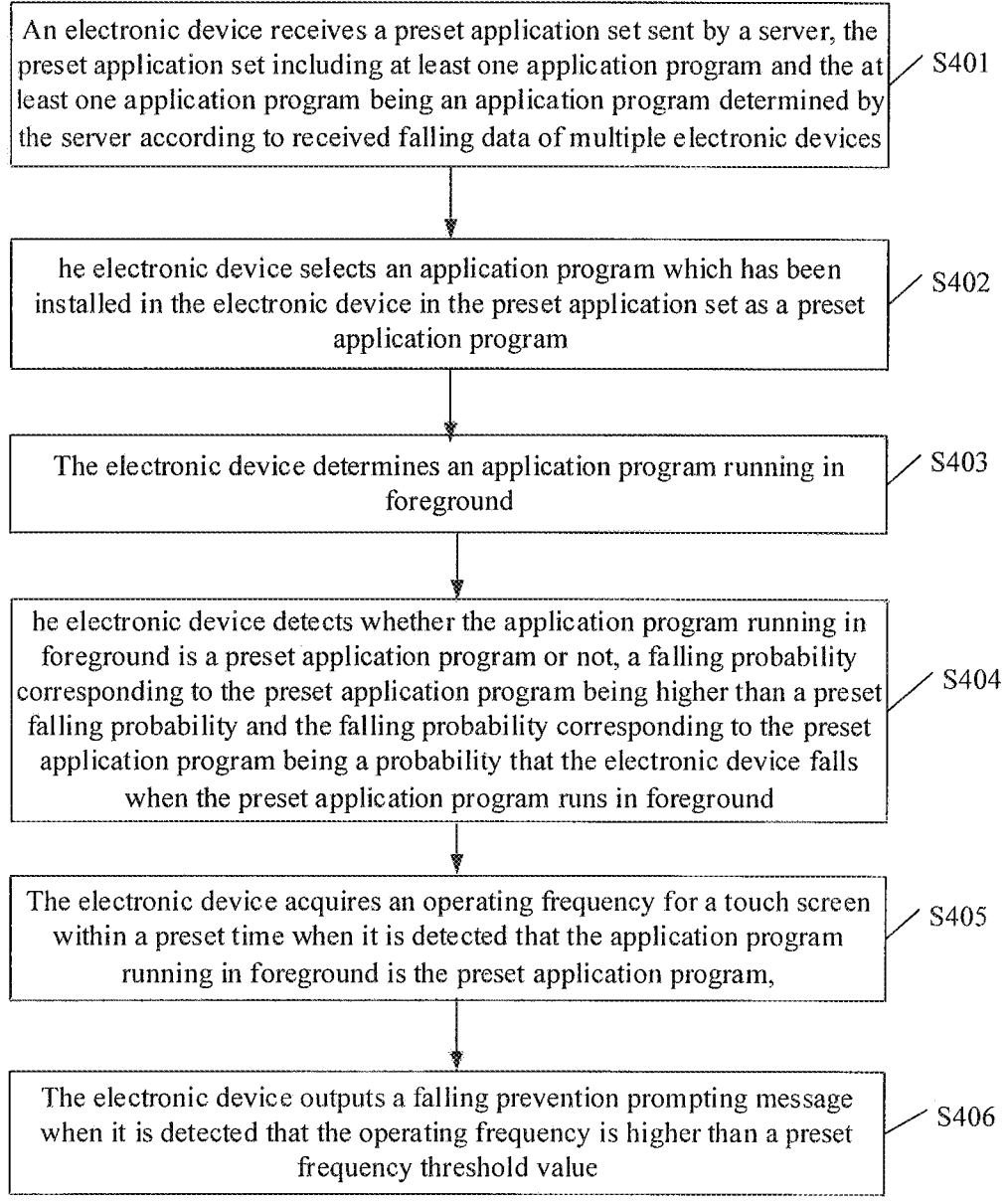
FIG. 9 is a flowchart of an additional prompting method according to an embodiment of the disclosure.

In line with the embodiment shown in FIG. 5, referring to FIG. 9, FIG. 9 is a flowchart of a prompting method according to an embodiment of the disclosure. The prompting method is applied to the electronic device of any embodiment of FIGS. 1 to 4 and, as shown in the figure, includes the following operations.

In S401, the electronic device receives a preset application set sent by a server, the preset application set including at least one application program and the at least one application program being an application program determined by the server according to received falling data of a plurality of electronic devices.

In S402, the electronic device selects an application program which has been installed in the electronic device in the preset application set as the preset application program.

In S403, the electronic device determines an application program running in foreground.

In S404, the electronic device detects whether the application program running in foreground is a preset application program or not, a falling probability corresponding to the preset application program being higher than a preset falling probability and the falling probability corresponding to the preset application program being a probability that the electronic device falls when the preset application program runs in foreground.

In S405, the electronic device, when it is detected that the application program running in foreground is the preset application program, acquires an operating frequency for a touch screen within a preset time.

In S406, the electronic device, when it is detected that the operating frequency is higher than a preset frequency threshold value, outputs a prompting message.

It can be seen in the embodiment of the disclosure that, the electronic device determines the application program running in foreground at first, then detects whether the application program running foreground is the preset application program or not, the falling probability corresponding to the preset application program being higher than the preset falling probability and the falling probability corresponding to the preset application program being the probability that the electronic device falls when the preset application program runs in foreground, and finally, when it is detected that the application program running in foreground is the preset application program, outputs the prompting message. Thus it can be seen that the electronic device, when it is detected that the application program running in foreground is the preset application program of which the corresponding falling probability is higher than the preset falling probability in a using process, outputs the prompting message to prompt the user that a falling event is likely to occur when the present application program is used and prompt the user to regulate a manner of operating the present application program to prevent occurrence of the falling event, which is favorable for reducing the falling probability of the electronic device and prolonging service life of the electronic device.

In addition, the electronic device receives the preset application set sent by the server and selects an application program suitable for the electronic device as the preset application program according to the preset application set. That is, the preset application program is determined by the server according to big data, which is favorable for improving determination comprehensiveness and accuracy of the preset application program. Moreover, determination through the server prevents a system resource of the electronic device from being occupied and is favorable for improving convenience and speed for determination of the preset application program.

Moreover, when the operating frequency for the touch screen in the preset time is higher than the preset frequency threshold value, the electronic device outputs the prompting message, which is favorable for improving falling prompting timeliness and accuracy.

Figure 10:
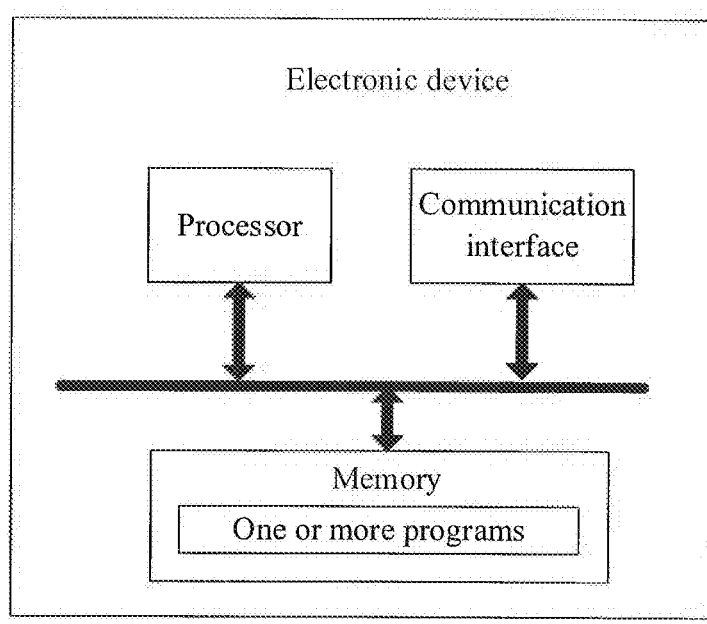
FIG. 10 is a structure diagram of an electronic device according to an embodiment of the disclosure.

In line with the embodiments shown in FIG. 5, FIG. 8 and FIG. 9, referring to FIG. 10, FIG. 10 is a structure diagram of an electronic device according to an embodiment of the disclosure. As shown in the figure, the electronic device includes a processor, a memory, a communication interface and one or more programs. The one or more programs are stored in the memory and are configured to be executed by the processor. The programs include instructions configured to execute the following operations of: determining an application program running in foreground; detecting whether the application program running in foreground is a preset application program or not, a falling probability corresponding to the preset application program being higher than a preset falling probability and the falling probability corresponding to the preset application program being a probability that the electronic device falls when the preset application program runs in foreground; and when it is determined that the application program running in foreground is the preset application program, outputting a prompting message.

It can be seen that, in the embodiment of the disclosure, the electronic device determines the application program running in foreground at first, then detects whether the application program running foreground is the preset application program or not, the falling probability corresponding to the preset application program being higher than the preset falling probability and the falling probability corresponding to the preset application program being the probability that the electronic device falls when the preset application program runs in foreground, and finally, responsive to detecting that the application program running in foreground is the preset application program, outputs the prompting message. Thus it can be seen that the electronic device, when it is detected that the application program running in foreground is the preset application program of which the corresponding falling probability is higher than the preset falling probability in a using process, outputs the prompting message to prompt the user that a falling event is likely to occur when the present application program is used and prompt the user to regulate a manner of operating the present application program to prevent occurrence of the falling event, which is favorable for reducing the falling probability of the electronic device and prolonging service life of the electronic device.

In a possible example, the programs further include instructions configured to execute the following operations of: before detecting whether the application program running in foreground is the preset application program or not, when it is detected that the electronic device falls, acquiring a reference application program running in foreground; determining a falling probability corresponding to the reference application program according to a historical usage record; and when it is determined that the falling probability corresponding to the reference application program is higher than the preset falling probability, determining that the reference application program is the preset application program.

In a possible example, the programs further include instructions configured to execute the following operations of: before detecting whether the application program running in foreground is the preset application program or not, receiving a preset application set sent by a server, the preset application set including at least one application program and the at least one application program being an application program determined by the server according to received falling data of a plurality of electronic devices; and selecting an application program which has been installed in the electronic device in the preset application set as the preset application program.

In a possible example, in outputting the prompting message when it is detected that the application program running in foreground is the preset application program, the instructions in the programs are configured to execute the following operations of: when it is detected that the application program running in foreground is the preset application program, acquiring an environmental parameter and outputting the prompting message according to the environmental parameter.

In the possible example, in outputting the prompting message according to the environmental parameter, the instructions in the programs are configured to execute the following operations of: when it is detected that a height parameter of the electronic device is greater than a preset height threshold value, outputting the prompting message and/or when it is detected that a temperature parameter in the environmental parameter is smaller than a preset temperature threshold value, outputting the prompting message.

In a possible example, in outputting the prompting message when it is detected that the application program running in foreground is the preset application program, the instructions in the programs are configured to execute the following operations of: when it is detected that the application program running in foreground is the preset application program, acquiring an operating frequency for the touch screen within a preset time and, when it is detected that the operating frequency is higher than a preset frequency threshold value, outputting the prompting message.

In a possible example, in outputting the prompting message, the instructions in the programs are configured to execute the following operations of: acquiring a falling probability of the application program running in foreground, determining an output strategy for the prompting message according to the falling probability and outputting the prompting message according to the output strategy.

The solutions of the embodiments of the disclosure are introduced mainly from the view of a method execution process. It can be understood that, for realizing the functions, the electronic device includes corresponding hardware structures and/or software modules executing each function. Those skilled in the art may easily realize that the units and algorithm steps of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiment of the disclosure, functional units of the electronic device may be divided according to the abovementioned method example. For example, each functional unit may be divided correspondingly to each function and two or more than two functions may also be integrated into a processing unit. The integrated unit may be implemented in a hardware form and may also be implemented in form of software functional unit. It is to be noted that division of the units in the embodiment of the disclosure is schematic and only logical function division and another division manner may be adopted during practical implementation.

Figure 11:
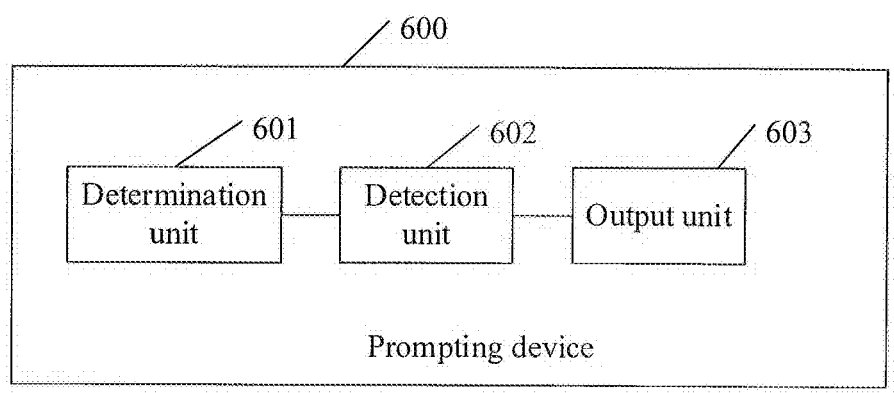
FIG. 11 is a block diagram of functional units of a prompting device according to an embodiment of the disclosure.

FIG. 11 is a block diagram of functional units of a prompting device 600 according to an embodiment of the application. The prompting device 600 is applied to an electronic device. The prompting device 600 includes a determination unit 601, a detection unit 602 and an output unit 603.

The determination unit 601 is configured to determine an application program running in foreground.

The detection unit 602 is configured to detect whether the application program running in foreground, determined by the determination unit 601, is a preset application program or not, a falling probability corresponding to the preset application program being higher than a preset falling probability and the falling probability corresponding to the preset application program being a probability that an electronic device falls when the preset application program runs in foreground.

The output unit 603 is configured to, when the detection unit 602 detects that the application program running in foreground is the preset application program, output a prompting message.

It can be seen that, in the embodiment of the application, the electronic device determines the application program running in foreground at first, then detects whether the application program running foreground is the preset application program or not, the falling probability corresponding to the preset application program being higher than the preset falling probability and the falling probability corresponding to the preset application program being the probability that the electronic device falls when the preset application program runs in foreground, and finally, when it is detected that the application program running in foreground is the preset application program, outputs the prompting message. Thus it can be seen that the electronic device, when it is detected that the application program running in foreground is the preset application program of which the corresponding falling probability is higher than the preset falling probability in a using process, outputs the prompting message to prompt the user that a falling event is likely to occur when the present application program is used and prompt the user to regulate a manner of operating the present application program to prevent occurrence of the falling event, which is favorable for reducing the falling probability of the electronic device and prolonging service life of the electronic device.

Figure 12:
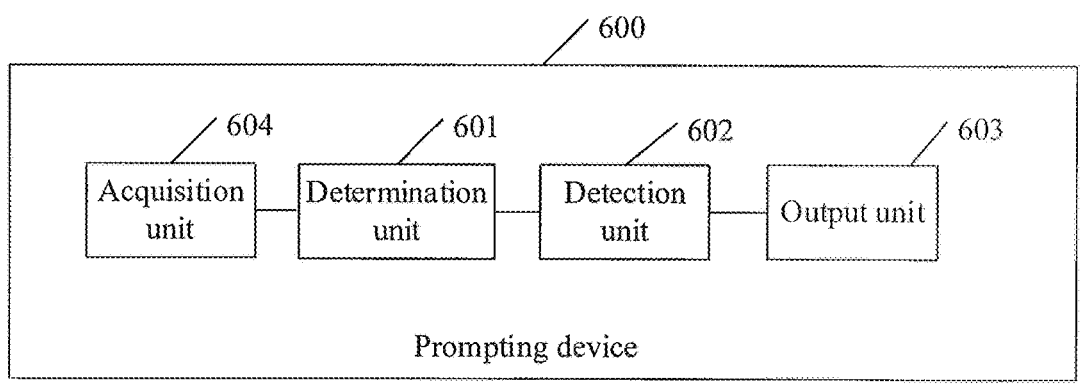
FIG. 12 is a block diagram of functional units of another prompting device according to an embodiment of the disclosure.

In a possible example, as shown in FIG. 12, the prompting device 600 further includes an acquisition unit 604.

The acquisition unit 604, before the detection unit 602 detects whether the application program running in foreground is the preset application program or not, is configured to, responsive to detecting that the electronic device falls, acquire a reference application program running in foreground.

The determination unit 601 is further configured to determine a falling probability corresponding to the reference application program acquired by the acquisition unit 604 according to a historical usage record and determine that the reference application program is the preset application program when it is detected that the falling probability is higher than the preset falling probability.

Figure 13:
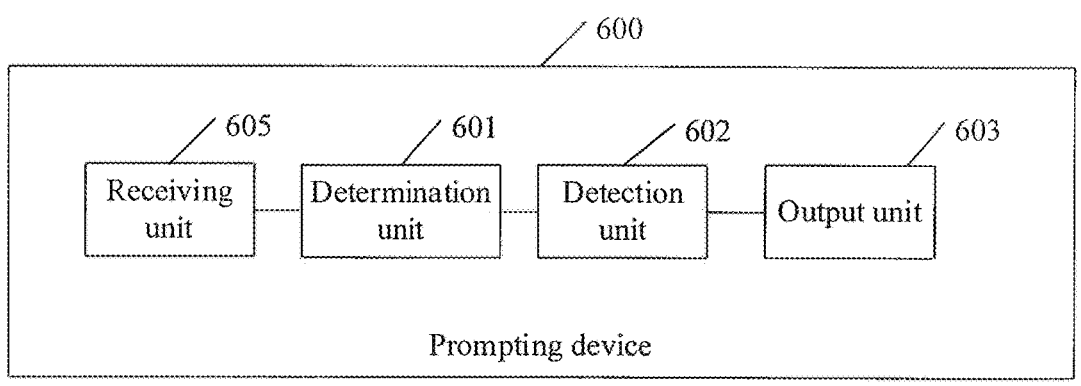
FIG. 13 is a block diagram of functional units of an additional prompting device according to an embodiment of the disclosure.

In a possible example, as shown in FIG. 13, the falling prompting device 600 further includes a receiving unit 605.

The receiving unit 605, before the detection unit 602 detects whether the application program running in foreground is the preset application program or not, is configured to receive a preset application set sent by a server, the preset application set including at least one application program and the at least one application program being an application program determined by the server according to received falling data of a plurality of electronic devices.

The determination unit 601 is further configured to select an application program which has been installed in the electronic device in the preset application set received by the receiving unit 605 as the preset application program.

In a possible example, in outputting the prompting message when it is detected that the application program running in foreground is the preset application program, the output unit 603 is configured to, when it is detected that the application program running in foreground is the preset application program, acquire an environmental parameter and output the prompting message according to the environmental parameter.

In the possible example, in outputting the prompting message according to the environmental parameter, the output unit 603 is configured to, when it is detected that a height parameter of the electronic device is greater than a preset height threshold value, output the prompting message and/or, when it is detected that a temperature parameter in the environmental parameter is smaller than a preset temperature threshold value, output the prompting message.

In a possible example, in outputting the prompting message when it is detected that the application program running in foreground is the preset application program, the output unit 603 is configured to, when it is detected that the application program running in foreground is the preset application program, acquire an operating frequency for the touch screen within a preset time and output the prompting message when it is detected that the operating frequency is higher than a preset frequency threshold value.

In a possible example, in outputting the prompting message, the output unit 603 is configured to acquire a falling probability of the application program running in foreground, determine an output strategy for the prompting message according to the falling probability and output the prompting message according to the output strategy.

The determination unit 601, the detection unit 602 and the acquisition unit 604 may be a processor, the output unit 603 may be a display and the receiving unit 605 may be a communication interface or a transceiver.

An embodiment of the disclosure further provides a computer storage medium. The computer storage medium stores a computer program configured for electronic data exchange. The computer program enables a computer to execute part or all of the steps of any method recorded in the abovementioned method embodiment. The computer includes a mobile terminal.

An embodiment of the disclosure further provides a computer program product. The computer program product includes a non-transitory computer-readable storage medium storing a computer program. The computer program may be operated to enable a computer to execute part or all of the steps of any method recorded in the abovementioned method embodiment. The computer program product may be a software installation package. The computer includes a mobile terminal.

It is to be noted that, for simple description, each method embodiment is expressed into a combination of a series of actions. However, those skilled in the art should know that the disclosure is not limited by the order of the actions described herein because some operations may be executed in another sequence or at the same time according to the disclosure. In addition, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to a plurality of network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to the conventional art or all of the technical solutions may be embodied in form of software product, and the computer software product is stored in a memory, including a plurality of instructions configured to enable a computer device (which may be a personal computer, a server, a network device or the like) to execute all or part of the steps of the method in each embodiment of the disclosure. The abovementioned memory includes various media capable of storing program codes, such as a U disk, a Read-Only Memory (ROM), a RAM, a mobile hard disk, a magnetic disk or an optical disk.

Those of ordinary skill in the art can understand that all or part of the steps in various methods of the embodiments may be completed by related hardware instructed by a program, the program may be stored in a computer-readable memory, and the memory may include a flash disk, a ROM, a RAM, a magnetic disk, an optical disk or the like.

The embodiments of the disclosure are introduced above in detail, the principle and implementation modes of the disclosure are elaborated with specific examples in the disclosure, and the descriptions made to the embodiments are only adopted to help the method of the disclosure and the core concept thereof to be understood. In addition, those skilled in the art may make variations to the specific implementation modes and the application scope according to the concept of the disclosure. From the above, the contents of the specification should not be understood as limits to the disclosure.

The invention claimed is:

1. An electronic device, comprising:
    a display, configured to display an application program running in foreground;
    a memory, configured to store a preset application program, a falling probability corresponding to the preset application program being higher than a preset falling probability and the falling probability corresponding to the preset application program being a probability that the electronic device falls when the preset application program runs in foreground; and
    a processor, connected with the display and the memory, wherein the processor is configured to detect whether the application program running in foreground is the preset application program or not and, responsive to detecting that the application program running in foreground is the preset application program, control the display to output a prompting message.

2. The electronic device of claim 1, further comprising an accelerometer,
    wherein the processor is further configured to acquire a reference application program running in foreground when the accelerometer detects that the electronic device falls, determine a falling probability corresponding to the reference application program according to a historical usage record and, responsive to determining that the falling probability corresponding to the reference application program is higher than the preset falling probability, determine that the reference application program is the preset application program.

3. The electronic device of claim 1, further comprising a communication module configured to receive a set of preset applications sent by a server, the set of preset applications comprising at least one application program and the at least one application program being an application program determined by the server according to received falling data from a plurality of electronic devices,
    wherein the processor is configured to select an application program which has been installed in the electronic device from the set of preset applications as the preset application program.

4. The electronic device of claim 1, wherein the processor is configured to, responsive to detecting that the application program running in foreground is the preset application program, acquire an environmental parameter and control the display to output the prompting message according to the environmental parameter.

5. The electronic device of claim 4, wherein the processor is configured to control the display to output the prompting message, responsive to detecting that a height parameter of the electronic device is greater than a preset height threshold value, and/or, responsive to detecting that a temperature parameter in the environmental parameter is smaller than a preset temperature threshold value.

6. The electronic device of claim 1, wherein the processor is configured to, responsive to detecting that the application program running in foreground is the preset application program, acquire an operating frequency of a touch screen in the display within a preset time and control the display to output the prompting message, responsive to detecting that the operating frequency is higher than a preset frequency threshold value.

7. The electronic device of claim 1, wherein the processor is configured to acquire a falling probability of the application program running in foreground, determine an output strategy for the prompting message according to the falling probability and control the display to output the prompting message according to the output strategy.

8. The electronic device of claim 7, wherein the processor is configured to determine an output frequency of the prompting message according to the falling probability, the output frequency of the prompting message being directly proportional to the falling probability.

9. The electronic device of claim 7, wherein the processor is configured to determine an output manner for the prompting message according to the falling probability.

10. The electronic device of claim 9, wherein the output manner for the prompting message comprises at least one of voice, breathing light flickering or text message.

11. A prompting method, comprising:
    determining an application program running in foreground;
    detecting whether the application program running in foreground is a preset application program or not, a falling probability corresponding to the preset application program being higher than a preset falling probability and the falling probability corresponding to the preset application program being a probability that an electronic device falls when the preset application program runs in foreground; and
    outputting a prompting message, responsive to detecting that the application program running in foreground is the preset application program.

12. The method of claim 11, further comprising:
    acquiring a reference application program running in foreground, responsive to detecting that the electronic device falls;
    determining a falling probability corresponding to the reference application program according to a historical usage record; and
    responsive to determining that the falling probability corresponding to the reference application program is higher than the preset falling probability, determining that the reference application program is the preset application program.

13. The method of claim 11, further comprising:
    receiving a set of preset applications sent by a server, the set of preset applications comprising at least one application program and the at least one application program being an application program determined by the server according to received falling data from a plurality of electronic devices; and selecting an application program which has been installed in the electronic device from the set of preset applications as the preset application program.

14. The method of claim 11, wherein outputting the prompting message, responsive to detecting that the application program running in foreground is the preset application program comprises:

acquiring an environmental parameter, responsive to detecting that the application program running in foreground is the preset application program; and outputting the prompting message according to the environmental parameter.

15. The method of claim 14, wherein outputting the prompting message according to the environmental parameter comprises:

responsive to detecting that a height parameter of the electronic device is greater than a preset height threshold value, outputting the prompting message; and/or, responsive to detecting that a temperature parameter in the environmental parameter is smaller than a preset temperature threshold value, outputting the prompting message.

16. The method of claim 11, wherein outputting the prompting message, responsive to detecting that the application program running in foreground is the preset application program comprises:

responsive to detecting that the application program running in foreground is the preset application program, an operating frequency for a touch screen within a preset time; and responsive to detecting that the operating frequency is higher than a preset frequency threshold value, outputting the prompting message.

17. The method of claim 11, wherein outputting the prompting message comprises:

acquiring a falling probability of the application program running in foreground;

determining an output strategy for the prompting message according to the falling probability; and outputting the prompting message according to the output strategy.

18. The method of claim 17, wherein determining an output strategy for the prompting message according to the falling probability comprises: determining an output frequency of the prompting message according to the falling probability, the output frequency of the prompting message being directly proportional to the falling probability.

19. The method of claim 17, wherein determining an output strategy for the prompting message according to the falling probability comprises: determining an output manner for the prompting message according to the falling probability, and wherein the output manner for the prompting message comprises at least one of voice, breathing light flickering or text message.

20. A non-transitory computer-readable storage medium, storing a computer program for a computer to execute operations of:

determining an application program running in foreground;

detecting whether the application program running in foreground is a preset application program or not, a falling probability corresponding to the preset application program being higher than a preset falling probability and the falling probability corresponding to the preset application program being a probability that an electronic device falls when the preset application program runs in foreground; and outputting a prompting message, responsive to detecting that the application program running in foreground is the preset application program.

\* \* \* \* \*